March 26, 1968  C. A. WOODCOCK  3,375,367
SNAP-IN HEADLIGHT ASSEMBLY
Filed May 31, 1966  2 Sheets-Sheet 1

INVENTOR
Charles A. Woodcock

By Norton Lesser
Attorney

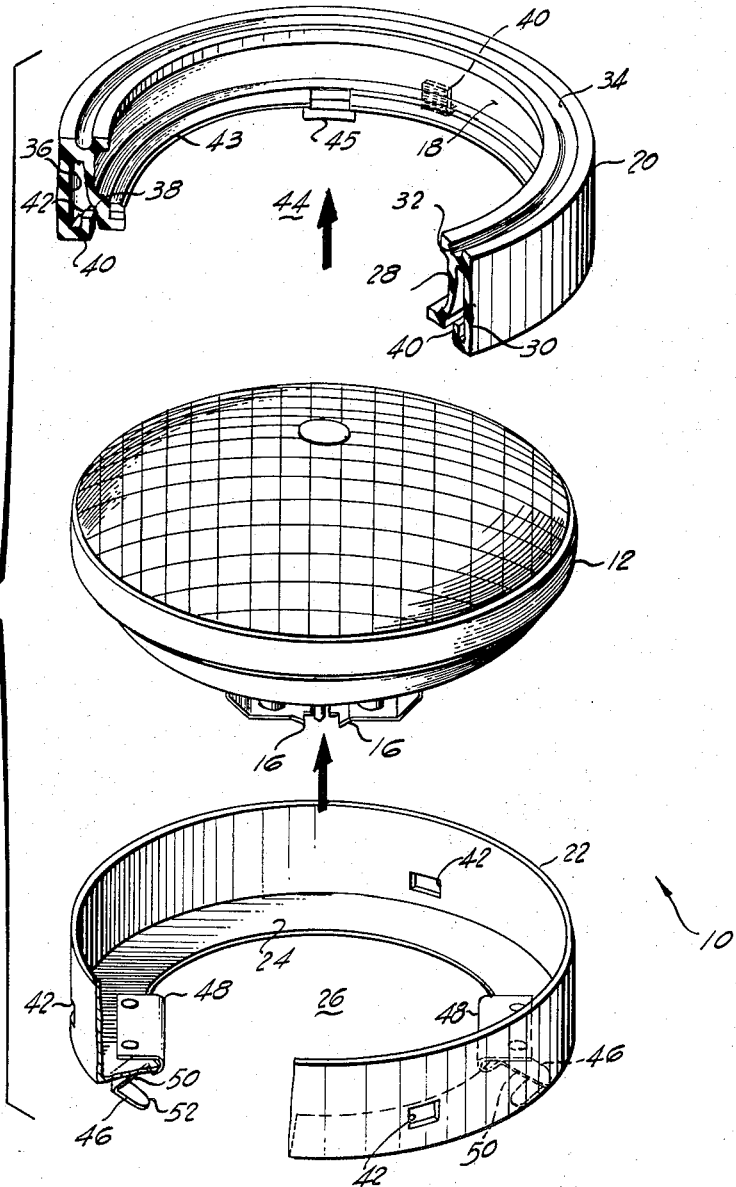

3,375,367
SNAP-IN HEADLIGHT ASSEMBLY
Charles A. Woodcock, Springfield, Ill., assignor to Stewart-Warner Corporation, Chicago, Ill., a corporation of Viriginia
Filed May 31, 1966, Ser. No. 554,019
4 Claims. (Cl. 240—52.1)

ABSTRACT OF THE DISCLOSURE

The following specification describes a snap-in headlamp assembly comprising a resilient mount which detachably receives both a headlamp and a frame member with the frame member carrying a pair of rearwardly and radially outwardly extending cantilever L-shaped arms for snap-in engagement with the tractor housing to retain both the mount and lamp on the tractor.

---

This invention relates to a snap-in headlamp assembly for a tractor.

Tractors and other vehicles designed to drive over unpaved terrain are subject to considerable vibration, and it is therefore preferred to support the headlamp in a shock or vibration mount. This in turn creates a problem in providing an economical, easily assembled and operable snap-in assembly of the headlamp and its vibration mount in its tractor housing.

It is therefore an object of the present invention to provide a tractor headlamp assembly which is snap mounted in a tractor housing.

It is another object of the present invention to provide an improved and more economical snap-in assembly of a headlamp and vibration mount.

Basically the objects of the invention are secured by a simple annular frame member which is detachably secured to the vibration mount and carries a pair of tab spring members in turn cooperating with the frame member to secure the assembly in the tractor housing.

Other objects and features of the present invention will become apparent on a further examination of the following specification and claims together with the drawings wherein:

FIG. 3 is an exploded perspective view of the headlamp vibration mount and snap-in frame.

Figure 1:
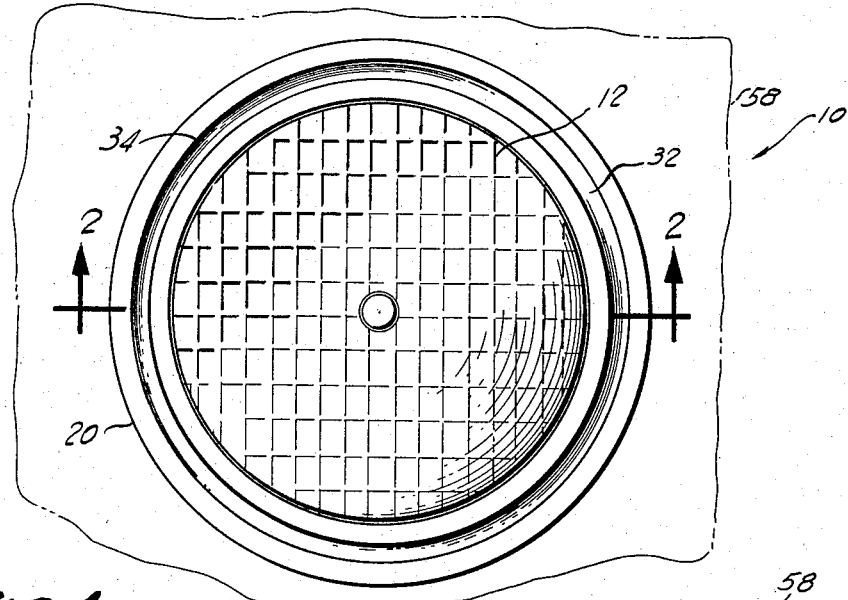
FIG. 1 is a front elevational view of the headlamp assembly with a portion of the tractor housing shown in broken lines.
Figure 2A:
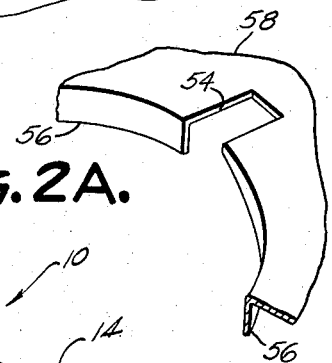
FIG. 2a is a perspective view of a rim portion of the tractor housing in which the lamp assembly is received to illustrate one of the notches more clearly.
Figure 2:
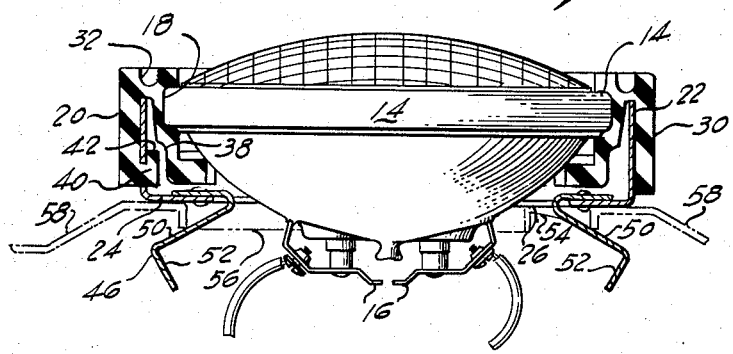
FIG. 2 is a sectional view taken along the line 2—2 in FIG. 1, also illustrating a portion of the tractor housing by means of broken lines.

In FIGS. 1, 2 and 3 the headlamp assembly is indicated generally by the reference character 10. The assembly 10 comprises a headlamp 12 having a peripheral annular bead 14 intermediate the convex front and rear surfaces of the lamp 12. A pair of terminals 16 projecting from the rear surface of the lamp 12 enable electrical connections to be extended thereto.

The lamp bead 14 is secured in an annular recess 18 of a retainer or vibration mount 20 formed of neoprene or similar resilient material having the desired shock absorbing qualities. The vibration mount 20 in turn is carried by an annular frame member 22 having an inwardly projecting circular flange 24. An opening 26 is provided in the circular flange through which the rear surface of the lamp projects without seating against the circular edge of flange 24.

The vibration mount 20 is generally similar to that shown in U.S. Patent No. 3,025,390, filed by the applicant. Mount 20 comprises two spaced apart annular wall sections 28 and 30 with recess 18 being formed in the inner surface of section 28. The two walls 28 and 30 are joined together adjacent the front of the assembly 10 by an end wall section 32 having a circular recess 34 in its front face so that a comparatively thin section is formed permitting easy flexure of wall 30 relative wall 28. A passageway 36, approximately 7/8" deep, is defined by the space between the two wall sections 28 and 30 with the passageway 36 being widened by a recess 38 at the rear edge of wall section 28 to a maximum width of approximately 1/4". The passageway 36 is generally annular for receiving the frame member 22; however, the inner surface of the passageway is tapered in conformance with the form of wall 28 to provide a somewhat thin wall section between recess 18 and passageway 36 for easy flexing.

The wall section 30 is somewhat longer than section 28 and is provided with a plurality of spaced lugs 40 located at substantially 120° to each other. The lugs 40 extend across the passageway 36 and only partially across the recess 38. Each lug 40 engages in a corresponding aperture 42 of the frame 22 and each lug 40 has an upwardly extending locking projection 42 thereon to prevent inadvertent separation between the mount and the frame member.

The wall 28 is slightly shorter than the wall 30 and has a rim 43 defining a central opening 44. A plurality of spaced stop members 45 project from the rim 43 at the rear end of wall 28 at substantially 90° to each other.

The frame member 22 carries a pair of L-shaped spring tabs 46 at 180° to each other and projecting rearwardly from the frame member. One end of each tab 46 is formed of .032" thick spring steel with a folded over integral section 48 approximately 5/8" long that is fastened to the front face of the flange 24 so that one leg 50 of each tab projects radially outwardly and rearwardly for about 1" and the other leg 52 projects radially inwardly and rearwardly for substantially 5/8" from the leg 50.

To assemble the lamp 12 to the vibration mount 20 the lamp 12 is simply inserted into the central opening with some force to stretch the mount until the bead 14 seats in recess 18. The apertures 42 of the frame member 22 are then aligned with lugs 40 and the leading edge of the frame member 22 is moved past the lugs 40 with the recess 38 serving as a guide until the frame member seats in passageway 36. In moving the frame 22 past the lugs 40 the vibration mount may be simply stretched in the area of each lug 40 to permit the frame to pass and on alignment of the lugs with respective apertures 40 the lugs are manipulated to cause the locking projection to pass through the aperture and detachably lock the frame member in position.

Thereafter, the tabs 46 on assembly 10 are aligned with respective openings or notches 54 provided in an annular rim 56 defining an opening in a tractor housing 58. The tabs 46 pass through the notches 54 until the rear face of the frame member flange 24 abuts the front face of the tractor housing. The assembly 10 is then rotated so that the annular flange 56 of the tractor housing is inserted between the rear face of flange 24 and the legs 50 of each tab to thereby apply pressure to the tabs to hold the assembly 10 firmly in position. If the notches 54 are omitted the tabs 46 may of course be simply forced past the rim edge to thereafter hold the assembly in position. The circular flange 24 provides a wide supporting area for the lamp assembly while enabling the rim or edge of the tractor opening to apply pressure to the tabs 46 for holding the headlamp assembly 10 in position.

With this arrangement the entire assembly 10 may be easily withdrawn from the tractor opening so that the headlamp 12 may be replaced. The removal of the lamp 12 from the mount 20 without removal of the annular wall of the frame member is difficult due to the constricting effect of the frame member on the mount, while detachment of the annular wall of frame member 22 from the mount is difficult while the headlamp assembly is in the tractor housing. This is due to the difficulty of manipulating the back edge of the wall 30 to free the lugs 40 until the headlamp assembly has been disengaged from the tractor. The proposed snap-in lamp assembly therefore provides a facile arrangement for engaging the lamp with the tractor and disengaging the same to permit easy removal of the lamp 12 from the assembly.

The foregoing constitutes a description of one embodiment of my invention whose inventive concepts are believed set forth in the accompanying claims.

What is claimed is:

1. A snap-in headlamp assembly for use on a tractor having an opening in a sheet housing for locating said assembly, the improvement comprising a headlamp having a peripheral bead and a pair of electrodes extending from one surface of said headlamp, an annular resilient member defined by two spaced apart annular wall sections with one of said wall sections having a recess for receiving said bead to detachably retain said lamp, a frame member having an annular wall for receipt between said two wall sections, means for detachably securing said frame member to said resilient member, and a pair of resilient tabs each having one end fastened to said frame member with the opposite end of each tab in free cantilever suspension and projecting rearwardly and radially outwardly with a portion of each tab extending beyond the edge of said frame opening and spaced from said frame member at a position coincident with the edge of said opening by a distance less than the cross section of the portion of said sheet housing defining said opening whereby said tabs are adapted to be inserted in said opening for detachably securing said assembly to said tractor with said frame member engaged against said sheet housing about the periphery of said opening.

2. The assembly claimed in claim 1 in which said tractor opening is defined by an annular rim having notches, and said tabs are L-shaped with both legs of each tab engaging in a respective notch whereafter rotation of said assembly grasps said rim between said frame member and said one leg of each tab.

3. A snap-in headlamp assembly for use on a tractor having an opening for locating said assembly, the improvement comprising a headlamp having a peripheral bead and a pair of electrodes extending from the rear surface of said headlamp, an annular resilient mount defined by two spaced apart annular wall sections with one of said wall sections having a recess for receiving said bead to detachably retain said lamp, a frame member having an annular wall for receipt between said two body members and a circular flange at one end of said annular wall with said flange having a central opening adapted to be aligned with said tractor opening, means integrally formed on said resilient mount and said frame member respectively for detachably securing said frame member to said mount, and a pair of resilient tabs fastened to said circular flange and projecting radially outwardly from the axis of said flange and rearwardly along said axis for insertion in said tractor opening to engage the edge of said tractor opening between said circular flange and said tabs with said tabs being stressed radially inwardly to detachably retain said assembly on said tractor with said circular flange abutting said tractor and said lamp rear surface and electrodes passing through both said flange and tractor openings to enable said electrodes to extend an electrical connection to said lamp from within said tractor.

4. A frame member for detachably securing a resilient mount carrying a headlamp to a tractor housing having an opening for locating said headlamp, the improvement comprising a frame member having an annular wall terminating in a circular flange at one end having a central opening through which said lamp protrudes on assembly of said mount and lamp to said frame member, means for detachably securing said mount to said frame member, and a pair of resilient tabs each having one end fastened to said circular flange and the opposite end of each tab in free suspension and extending rearwardly and radially outwardly from the inner edge of said flange opening for engaging the edge of said tractor opening between said circular flange and tabs with the unexpanded distance between said tabs and said flange adjacent the edge of said housing opening being less than the thickness of the housing portion defining said opening whereby said tabs are placed under tension for detachably securing said frame member, resilient mount and headlamp to said tractor with said circular flange engaged against the housing portion defining said opening.

References Cited

UNITED STATES PATENTS

| 1,842,025 | 1/1932 | Huebner | 240—152 X |
| 3,025,390 | 3/1962 | Woodcock | 240—41.5 |

FOREIGN PATENTS

| 793,526 | 4/1958 | Great Britain. |

NORTON ANSHER, *Primary Examiner.*

J. W. PRICE, *Assistant Examiner.*